United States Patent [19]
Nims et al.

[11] 3,814,513
[45] June 4, 1974

[54] 3-D SCREEN AND SYSTEM

[75] Inventors: Jerry Curtis Nims, Atlanta, Ga.;
Allen Kwok Wah Lo, Kowloon,
Hong Kong

[73] Assignee: Dimensional Development Corporation, Chamblee, Ga.

[22] Filed: July 24, 1972

[21] Appl. No.: 274,603

[52] U.S. Cl. ................................. 353/7, 353/94
[51] Int. Cl. ................................. G03b 21/00
[58] Field of Search .......... 353/7, 8, 9, 10; 350/170; 95/18 P

[56] References Cited
UNITED STATES PATENTS

| | | | |
|---|---|---|---|
| 2,661,651 | 4/1953 | Stipek | 353/7 |
| 3,063,333 | 11/1962 | Pareto | 350/120 |
| 3,675,553 | 7/1972 | Dudley | 95/18 P |

*Primary Examiner*—William D. Martin, Jr.
*Assistant Examiner*—A. Jason Mirabito
*Attorney, Agent, or Firm*—Newton, Hopkins & Ormsby

[57] ABSTRACT

A lenticular composing screen focusses a number of two dimensional pictures each as a series of horizontally condensed and horizontally separated image strips and the image strips of the several pictures are uniformly spaced so that blank spaces normally would appear between them. A light diffusing screen receives these strips and a viewing screen allows observers to receive composite images of different pictures in the left and right eyes. The composing screen is vibrated harmonically so that each image strip is shifted from its normal position to a position filling the blank space to one side of it, the harmonic motion assuring that the two positions of each image strip are temporarily stationary while intermediate positions are swept so rapidly as to be undetected by the observer while, at the same time, the integrating or memory characteristics of the human eye retain the temporarily stationary images being observed.

7 Claims, 4 Drawing Figures

3-D SCREEN AND SYSTEM

BACKGROUND OF THE INVENTION

In copending application Ser. No. 171,269, filed Aug. 12, 1971, and now abandoned, there is disclosed means for composing three-dimensional pictures from a plurality of two-dimensional views of the same subject. The present invention discloses means whereby a plurality of two-dimensional views of the same subject may be presented for three-dimensional observation on a viewing screen.

If a great enough number of two-dimensional views are projected so as to present, for viewing through a lenticular screen, an uninterrupted display for side-by-side widthwise condensed and separate image strips, an observer may view from any vantage point the scene or scenes so projected as a three-dimensional image. In this case, the projected strips completely fill the image space but do so with no overlap, for overlap will cause loss of sharpness or detail. Obviously the lenticular composing-viewing screen of any such system must be well designed and constructed with precision if these conditions are to be met. As an alternative, fewer two dimensional images may be projected so that the condensed image strips are spaced from each other. Although this has the advantage of requiring fewer two-dimensional image projections and of relaxing the precision requirements on the lenticular composing-viewing screen, it is disadvantageous in that observers will be able to view the entire image only from certain positions and observers in other positions may observe only a portion of some of the projected images.

BRIEF SUMMARY OF THE INVENTION

According to this invention, in order to allow observers at all observation points to receive complete composite images of different, stereoscopically related pairs of two-dimensional views when composing screen means is used in conjunction with a number of projected images less than that which would completely fill the image space, the composing screen means is vibrated rapidly so that the image strips shift back and forth in the widthwise direction. The amount of shift is equal to the width of the blank spaces between image strips so that, in reality, no blank spaces are continuously present. The vibration is harmonic so that the shifted images momentarily are stationary but with the shifting through intermediate positions being so rapid as to be undetectable by observers. The memory or integrating characteristic of the human eye retains one set of stationary images as a continuous stationary image.

DETAILED DESCRIPTION OF THE INVENTION

Figure 1:
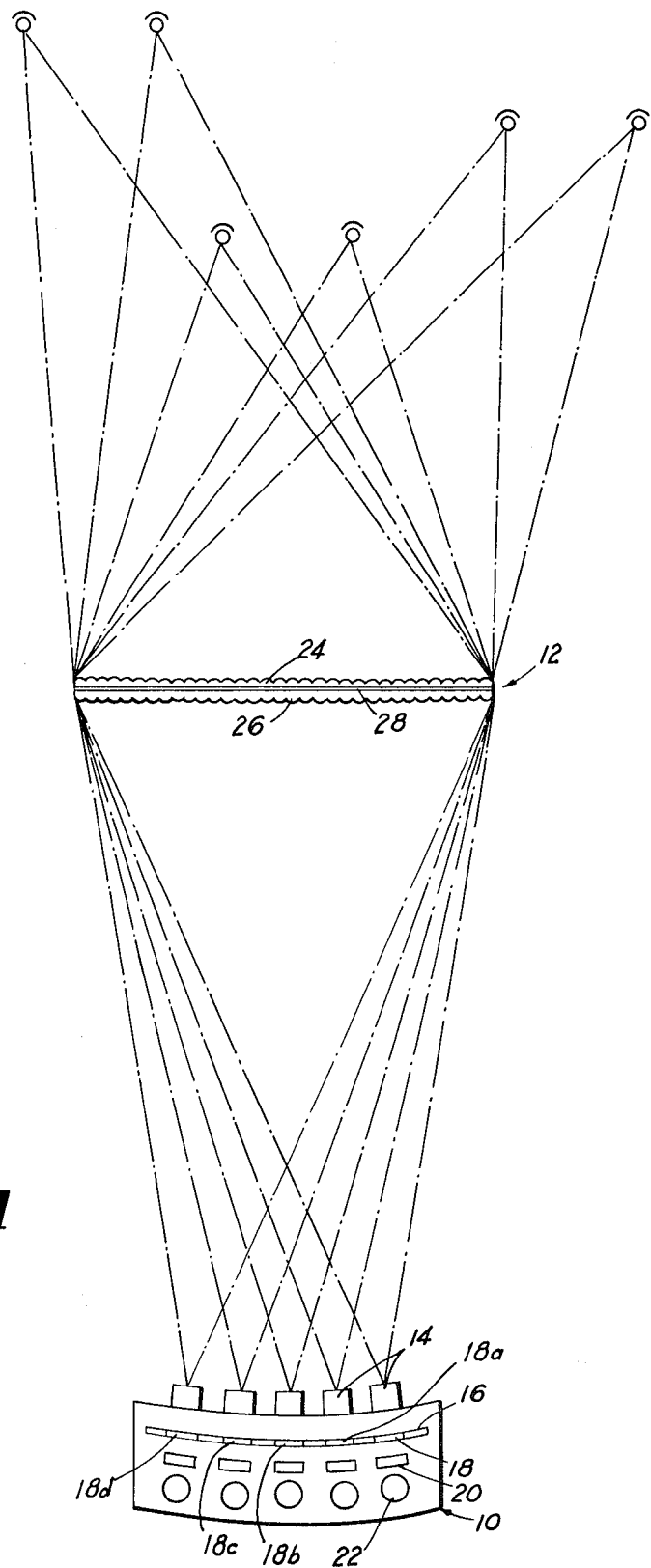
FIG. 1 is a diagrammatic plan view illustrating certain principles of the present invention.

With reference to FIG. 1, the system according to the present invention incorporates the projection means indicated generally by the reference character 10 and the screen means indicated generally by the reference character 12. The projecting means 10 comprises a series of projecting lenses 14 disposed in uniformly laterally spaced relationship and disposed along an arc so as to project their images onto a common image plane surface. Each lens projects the image from an image film strip 16, the image portions being indicated by the reference characters 18 thereon and each projecting lens 14 has associated with it a condensing lens assembly 20 and a light source 22, all as is conventional. The various image portions 18 are each of the same subject but are taken from different vantage points corresponding to the vantage point positions of the projecting lenses 14, the means by which the image film strips are formed being described with particularity in the above-mentioned copending application.

The screen means 12 comprises a viewing screen 24 of lenticular form and a composing screen 26 also of lenticular form and interposed between these two screens is a light diffusing layer 28. As will be more apparent from FIG. 2, wherein the screen means is shown on enlarged scale, the composing screen 26 focusses each image portion 18 of the film strip as a series of horizontally spaced and horizontally condensed image strips, the composite of which forms the complete image projected. The positioning of the projecting means 10 and the curvatures of the lenticules of the composing screen 26 together with its thickness, effects focus of one image strip of each image composite beneath each individual lenticule 30 so that the image strips 32, 34, 36, 38 and 40 represent portions of the composite images from the several image portions 18, 18a, 18b, 18c, and 18d, of the film strip 16.

Figure 2:
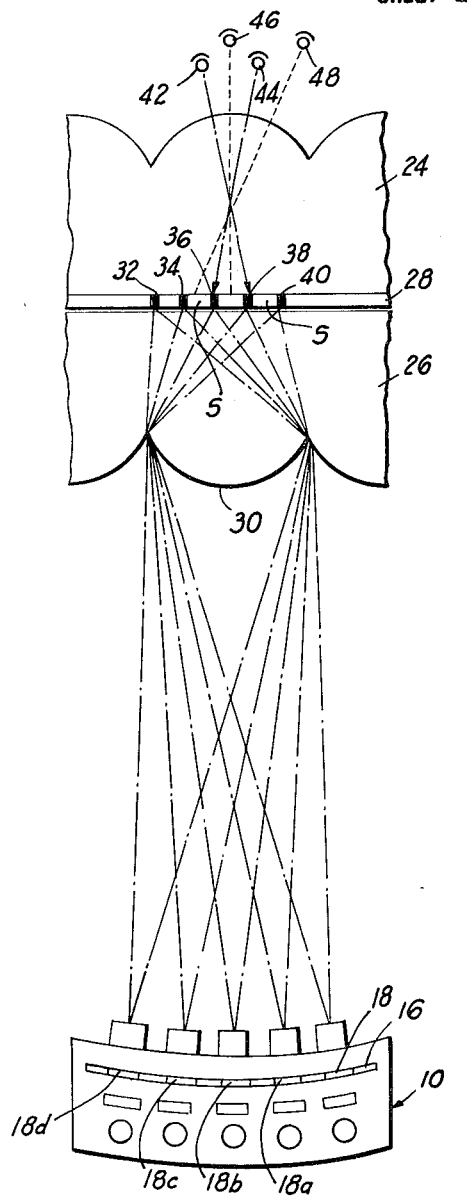
FIG. 2 is a view similar to FIG. 1 but showing the screen on enlarged scale.

In the position shown in FIG. 2, there are blank spaces S left between adjacent image strips associated with each lenticule, the width of which blank spaces depends upon the number of projected images, the design of the composing screen, etc. By leaving blank spaces, the number of projected images required is less and no concern need be had as to overlap of image strips which would cause loss of sharpness and definition. Thus, in the position shown in FIG. 2, the observer whose eyes are indicated by reference characters 42 and 44 respectively are observing the stereoscopic image pairs 36 and 38, and of course as well other pairs from other lenticules to receive the composite picture for each eye, which composite pictures are stereoscopically related, whereas the observer whose eyes are indicated by reference characters 46 and 48 are observing blank spaces S.

Figure 3:
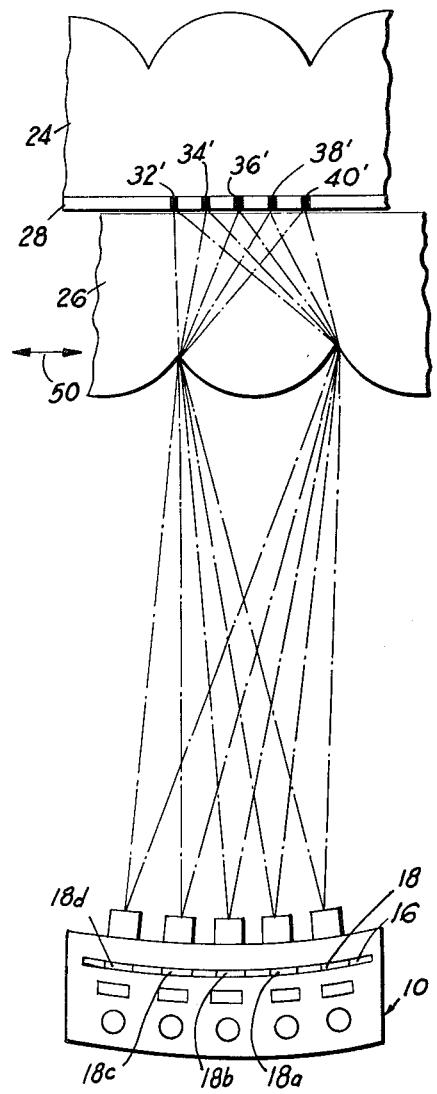
FIG. 3 is a view similar to FIG. 2 but showing a fully shifted position of the composing screen.

With reference now to FIG. 3, the composing screen 26 will be seen to be vibrating back and forth in the direction of the arrows 50 and the stroke of this vibration is substantially equal to the width of a space S so that, in the shifted position of FIG. 3, the image strips 32', 34', 36', 38' and 40', now occupy positions filling the spaces to the right of the corresponding unprimed image strips shown in FIG. 2. The vibrating motion back and forth in the direction of the arrows 50 is harmonic in nature such that the two image positions shown in FIGS. 2 and 3 are stationary image positions and all intermediate positions are moving with relatively great velocity so that the eyes of the observer are not confused by the motions of such intermediate positions.

Figure 4:
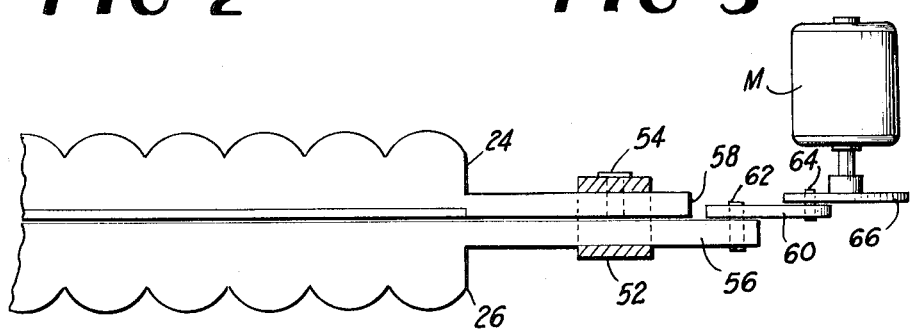
FIG. 4 is a view illustrating means for vibrating the composing screen.

To effect this harmonic motion, any suitable means may be employed. For example, reference is had to FIG. 4 wherein it will be seen that the composing screen 26 is slidably mounted at its opposite vertical edges by means of a mounting frame 52 to which the viewing screen 24 is rigidly affixed as by fasteners 54. The extension 56 of the composing screen 26 extends beyond the corresponding edge 58 of the stationary viewing screen and is connected by a suitable link 60 through pivot pins 62 and 64, respectively, to a disc 66 rotatably driven by the motor M. The rotational speed of the motor M is such as to effect a frequency of vibration in the order of 10–300 cps, preferably 50 cps and, as discussed above, the stroke of the vibrating motion is equal to or substantially equal to the width of one of the blank spaces S shown in FIG. 2.

As a consequence of the harmonic vibratory motion, the two stationary image positions shown in FIGS. 2 and 3 will permit all observers to see stereoscopic pairs of image strips so as to view the composite images as a three-dimensional scene while, at the same time, the frequency of vibration is sufficiently fast as to prevent blurring by the sweeping motion between the stationary positions of the shifting images but not so fast that what the human eye, exercising its inherent memory or integrating characteristics, cannot "remember" one or the other of the stationary positions of the images, whichever set is being viewed by the particular observer.

In this way, observers from different vantage points can see the three-dimensional scene being depicted because of the provision for vibrating the composing screen so that the images are shifted rapidly to fill the blank spaces.

What is claimed is:

1. A system for displaying pictures in three dimensions, which comprises:

means for simultaneously projecting a plurality of images of a scene, each of said plurality of images having been recorded at a different vantage point relative to said scene;

lenticular composing screen means for receiving the plurality of projected images and focusing them as a corresponding plurality of widthwise condensed image strips beneath each lenticule of the composing screen means, the plurality of condensed image strips beneath each lenticule being spaced apart widthwise of the lenticule to present blank strips of substantially uniform width between adjacent image strips;

lenticular viewing screen means in back-to-back opposition to said composing screen means for presenting separate composite images of the scene to the two eyes of an observer; and means for harmonically vibrating said composing screen means in the widthwise direction of said condensed image strips, during simultaneous projection of said plurality of images, at a frequency and through a distance sufficient to present said separate composite images at substantially all observable positions in the viewing plane of said viewing screen means.

2. A system as defined in claim 1 including light diffusing means interposed between said viewing screen means and said composing screen means.

3. A system as defined in claim 1 wherein said means for vibrating has a stroke substantially equal to the widthwise dimension of said blank strips.

4. A system as defined in claim 3 wherein said means for vibrating operates at a frequency within the range of from about 10 to about 300 cycles per second.

5. A screen assembly for viewing two dimensional images of a scene in three dimensions, which comprises:

lenticular composing screen means for focusing images projected thereon from a plurality of two-dimensional pictures of the scene, each of said plurality of two-dimensional pictures having been taken at a different vantage point relative to the scene, as a corresponding plurality of widthwise condensed image strips beneath each lenticule of the composing screen means, the plurality of condensed image strips beneath each lenticule being spaced apart widthwise of the lenticule to provide blank strips of substantially uniform width between adjacent image strips;

lenticular viewing screen means in back-to-back opposition to said composing screen means for allowing an observer to receive with one eye a composite image of the scene including substantially all of the image strips corresponding to one two-dimensional picture and with the other eye a separate composite image of the scene including substantially all of the image strips corresponding to another two-dimensional picture; and means for harmonically vibrating said composing screen means to shift said condensed image strips by an amount substantially equal to the width of said blank strips.

6. A screen assembly as defined in claim 5 wherein said means for vibrating operates at a frequency within the range of from about 10 to about 300 cycles per second.

7. A screen assembly as defined in claim 5 including light diffusing means interposed between said viewing screen means and said composing screen means.

* * * * *